Dec. 23, 1958 L. P. GIESELER 2,865,200
WIND TUNNEL ROLL-MOMENT BALANCE
Filed Oct. 27, 1954 3 Sheets-Sheet 1
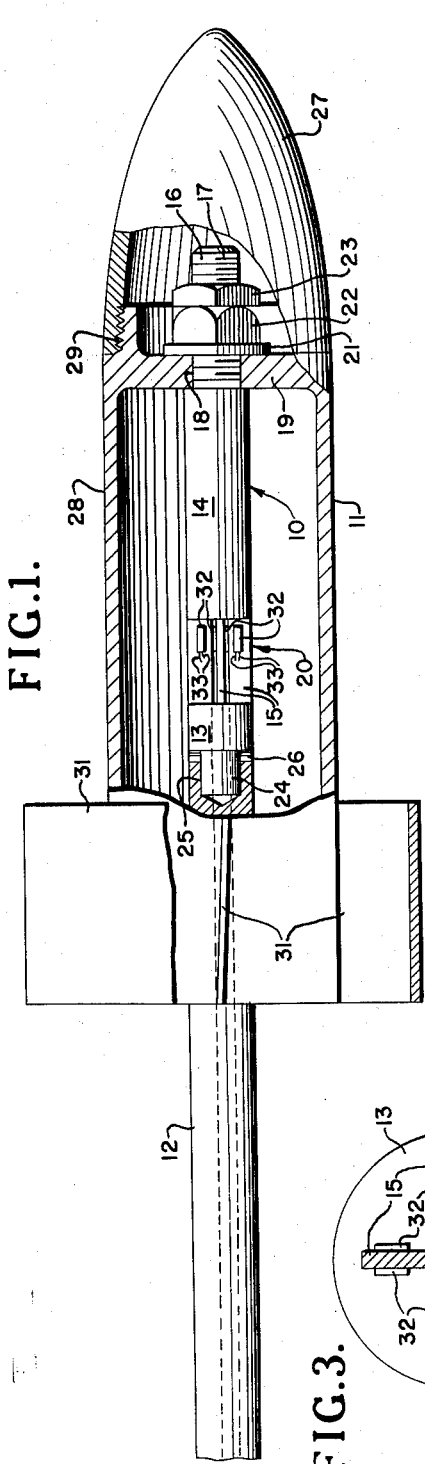
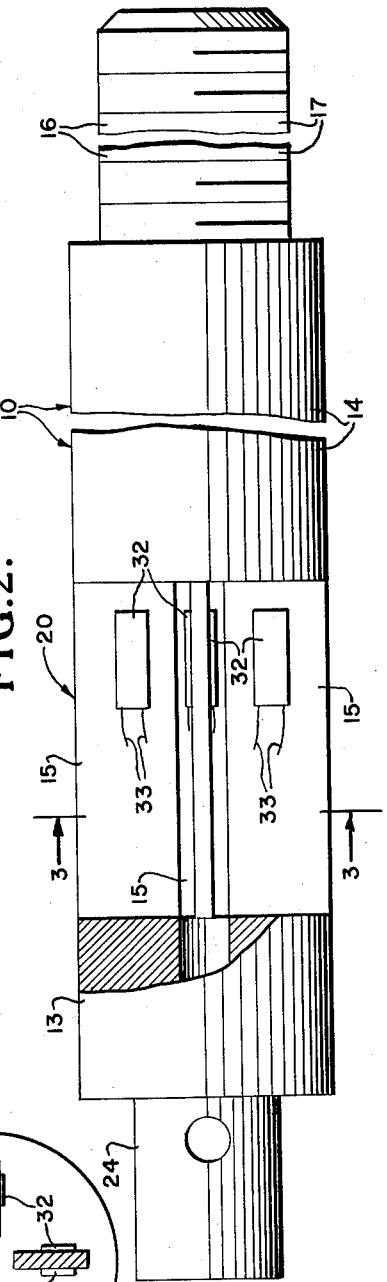
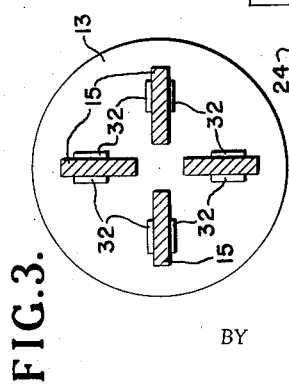
INVENTOR
L. P. GIESELER Dec. 23, 1958 — L. P. GIESELER — 2,865,200
WIND TUNNEL ROLL-MOMENT BALANCE
Filed Oct. 27, 1954 — 3 Sheets-Sheet 2

INVENTOR
L. P. GIESELER

BY
ATTORNEYS

Dec. 23, 1958     L. P. GIESELER     2,865,200
WIND TUNNEL ROLL-MOMENT BALANCE
Filed Oct. 27, 1954     3 Sheets-Sheet 3
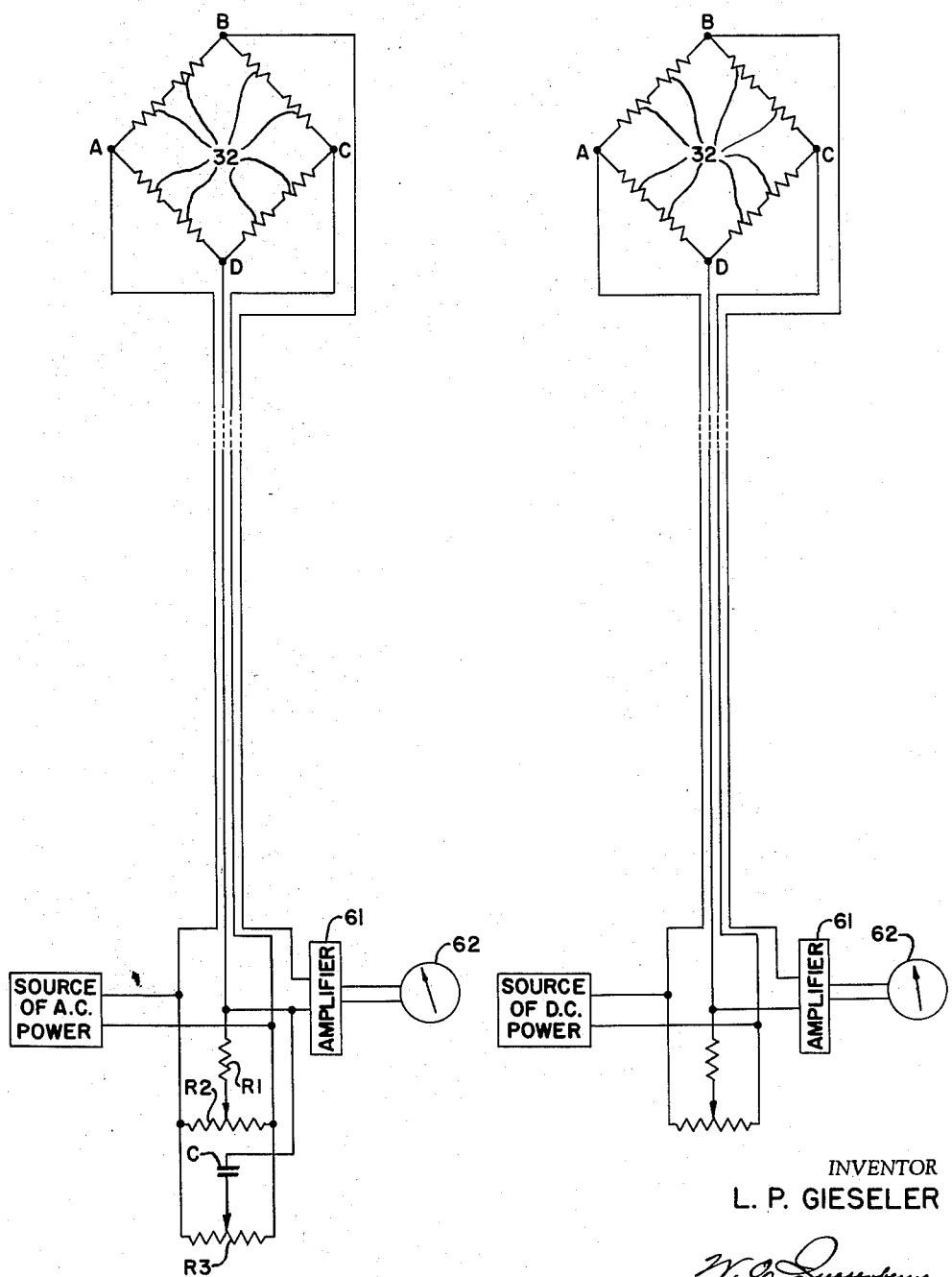
INVENTOR
L. P. GIESELER
BY
ATTORNEYS United States Patent Office 2,865,200
Patented Dec. 23, 1958

2,865,200

WIND TUNNEL ROLL-MOMENT BALANCE

Luther P. Gieseler, Rockville, Md.

Application October 27, 1954, Serial No. 465,159

5 Claims. (Cl. 73—147)

(Granted under Title 35, U. S. Code (1952), sec. 266)

The invention described herein may be manufactured and used by or for the Government of the United States of America for governmental purposes without the payment of any royalties thereon or therefor.

The present invention relates generally to a device for use in a wind tunnel and more particularly to new and improved balance device having provision for the internal measurement of rolling moment or torque caused by the wind force acting externally on aerodynamic objects under test such, for example, as models of ordnance missiles, rockets and the like thereby to determine the rolling moment applied to the object as the object is subjected to the aerodynamic forces.

More specifically the device provides a balance device having new and improved elastic means constructed and arranged to be responsive to rolling moment and which will resist other forces and moments such, for example, as lift, drag, yaw, forces and pitching and yawing moments. Moreover, with the aforesaid arrangement of the present invention the rolling moment caused by an external force acting on the aerodynamic model mounted on the balance during a testing operation may be measured internally of the model and the internal balance construction in accordance with the principle of the invention is located completely within and enclosed by the model, the balance being detachably secured to the sting and model with the sting mounted on the conventional wind tunnel support.

The internal measurement is accomplished by the use of an elastic web structure carried by the balance which is constructed and arranged in such a manner that the webs are disposed parallel to the axis of the sting to which it is secured and it may readily be enclosed within the aforesaid model and in cooperative relation with respect to wire resistance strain gages applied to predetermined surface areas of the webs in an appropriate manner, effective to individually sense inside of the model the rolling forces acting outside the model. Such measurements are obtained with a high degree of accuracy and in much less time than formerly required by the use of prior art devices.

Whereas the strain gages are disclosed herein as particularly well suited for use in balances of the type set forth herein, it will be understood that, if desired, detecting devices such, for example, as capacitive, inductive, and piezoelectric systems may be employed in lieu of the strain gages to yield a capacitance or inductance variation in response to the displacement of the associated elastic web elements, or to yield a voltage variation in response to the torque on the elastic web system and piezoelectric element supported thereon.

An object of the present invention is to provide a new and improved balance for internal measurement of forces resulting in a roll moment acting externally on an aerodynamic body.

Another object of the invention is the provision of a new and improved elastic balance structure which is readily fixed in response to an applied rolling moment and which will readily resist other forces and moments applied thereto.

A further object of the invention is the provision of a new and improved elastic balance having means responsive to rolling moment caused by the aerodynamic forces applied to a body supported externally thereof and interconnected to a bridge circuit, the output of which is employed to control an electroresponsive indicator thereby to indicate the magnitude of the forces.

Other objects and many of the attendant advantages of the invention will be readily appreciated as the same becomes better understood by reference to the following detailed description when considered in connection with the accompanying drawings wherein:

Fig. 1 is a view of the balance constructed in accordance with the present invention illustrating a test model attached thereto and the sting for supporting the balance, the model being partially in section and partially an elevation;

Fig. 2 is an enlarged elevational view of the balance of Fig. 1, partially broken away and partially in section;

Fig. 3 is a sectional view taken on the line 3—3 of Fig. 2;

Fig. 7 is a circuit arrangement suitable for use with balance devices of Figs. 2 and 5; and, Fig. 8 is an alternative arrangement of the circuit illustrated on Fig. 7.

Figure 4:
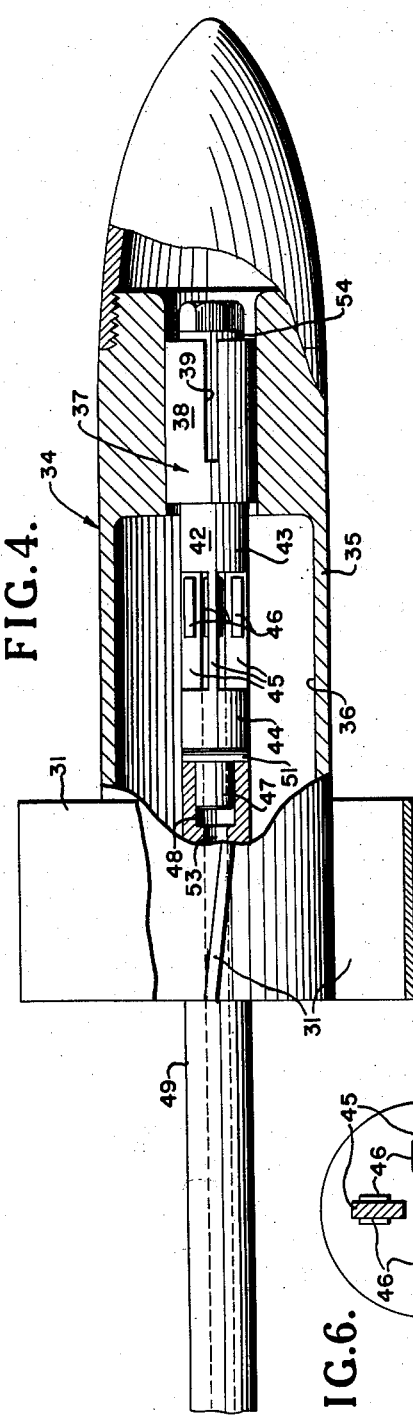
Fig. 4 is a view similar to Fig. 1 illustrating an alternative arrangement of the balance device of Fig. 1, in operative relation with the model and sting, the model and sting being partially broken away and partially in section.

Referring now to the drawings wherein like reference characters designate like parts throughout the several views and more particularly to Fig. 1 thereof, the numeral 10 generally indicates the balance device of the present invention, 11 indicates the test model, and 12 indicates a conventional sting.

The balance device comprises a pair of cylindrical members 13 and 14 having disposed therebetween an element 20 comprising a plurality of flexible webs 15 substantially cruciform in configuration arranged parallel to the axis of the sting and integrally formed with the aforesaid members 13 and 14. The element 14 has formed thereon a stub shaft 16 threaded as at 17 and disposed in a centrally disposed opening 18 formed in an internal support 19 carried by the model 11. The support 19 is disposed between the element 14 and a washer 21, the washer and element 14 being maintained in engagement with the support by a nut 22 and a lock nut 23 threaded on stub shaft 16. By the aforesaid arrangement the model 11 is secured to the balance.

The element 13 is provided with a boss or shaft 24 integrally formed therewith and of somewhat smaller diameter than the element 13, the boss being disposed within a socket 25 formed in the sting 12 and secured thereto by a pin 26. Thus by this arrangement the model is adapted to be supported in the air stream with the balance enclosed by the model whereupon the balance is not subjected to the wind tunnel air blast.

It will be noted in Fig. 1 that the model is provided with a nose 27 detachably secured to the body 28 as at 29 such that the nose may be removed from the body to facilitate securing of the model to the balance, the model being provided with the usual hood and canted fin structure 31 attached to the after part of body 28.

The aforesaid webs of the cruciform structure are each provided with a pair of strain gages 32 having conductors 33 for establishing an external connection to a conventional electrical measuring apparatus (not shown). The gages may be secured to the webs in any suitable manner such, for example as by cement. It will be understood, however, that the rolling moment of the model in a clockwise or counter clockwise direction in response to impingement of the air blast against canted fins 31, for example, will be transmitted to the elastic web structure of the balance which results in an electric output from the strain gages whereupon the magnitude of such moment is indicated on the electroresponsive indicator illustrated on the circuit arrangements of Figs. 7 and 8. The operation of the circuit arrangements will be hereinafter more fully set forth.

Figure 5:
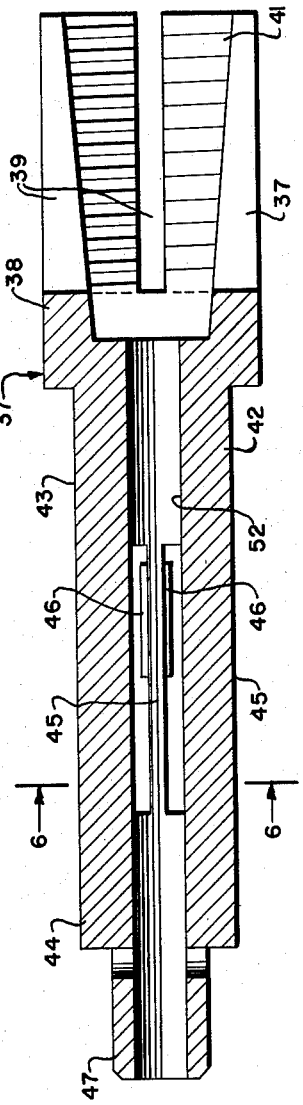
Fig. 5 is an enlarged longitudinal sectional view of the device of Fig. 4.
Figure 6:
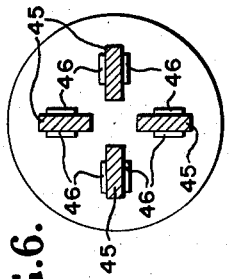
Fig. 6 is a sectional view taken on the line 6—6 of Fig. 5.

Referring now to the arrangement as illustrated on Figs. 4 to 6 and more particularly to Fig. 4, the model is designated by the reference character 34 and comprises a hollow body 35 having a centrally disposed bore 36 extending therethrough. The balance for supporting the model 34 is generally similar to the device of Fig. 1 and is indicated by the number 37, the balance 37 comprising a head 38 having a plurality of diametrically disposed slots 39 and a threaded tapered bore 41 formed therein. An extension 42 is integrally formed with the head and comprises a pair of mutually spaced cylindrical portions 43 and 44 having disposed therebetween and formed therewith a plurality of flexible webs 45 in cruciform configuration, each of the webs being provided with a pair of strain gages 46. As shown more clearly on Fig. 5, a boss 47 is formed on portion 44 and disposed within the socket 48 formed in the sting 49, the sting being secured to the boss by the pin 51.

It will be noted in Fig. 5 that the tapered bore 41 in head 38 terminates in a bore 52 which extends through extension 42, the boss 47 being disposed within the socket 48 which is an enlargement of a longitudinal bore 53 formed in the sting 49. The aforesaid bore arrangement is particularly adapted to receive and house strain gage conductor thereby to establish an electrical connection between the gages and the electrical measuring apparatus of Figs. 7 and 8. If desired, however, the bore 52 extending through element 42 and boss 47 may be omitted and suitable grooves may be formed in the balance and sting for housing the aforesaid conductor.

As more clearly shown on Fig. 4 a tapered wedge plug 54 is threaded into the tapered bore 41 of head 38 whereupon the head is forcibly moved into locking engagement with the wall defining the bore 36 in the model by reason of the aforesaid slot 39 formed in the head as the wedge is threaded into bore 41. Thus by this arrangement the model is locked to the head and maintained in the air stream.

While the aforesaid balance has been described as having four flexible webs it will be understood that, if desired, any number of webs may be employed such, for example, as six, eight or ten. Moreover, if desired, the flexible webs may be integrally formed with the sting in lieu of the detachable arrangement of Figs. 1 to 6.

Referring now to Fig. 7, there is illustrated a circuit arrangement utilizing a strain gage bridge for determining the degree of forces on the strain gages. The bridge comprises four arms A—B, B—C, C—D and D—A, each having two strain gages connected in series. A source of A.-C. potential is connected across the bridge at junctions A and C for supplying the operating bridge potential. The output of the bridge is taken from junctions B and D and applied to the input of amplifier 61. Resistor R1 and ajustable resistor R2 are connected to the bridge circuit for initially balancing the bridge to compensate for any inherent differences in the strain gage elements. A phasing network, R3 and C, is employed to adjust the phase of the A. C. potential supplied to the bridge. A meter 62, whose deflection is a measure of the unbalance created in the bridge due to stresses on the strain gage elements, is connected to the output of the amplifier.

In the operation of Fig. 7, the bridge is initially balanced by adjusting resistors R2 and R3 to obtain a zero reference deflection on meter 62. Upon forces being exerted on the strain gage elements, the bridge is unbalanced due to variations in the resistive values of the strain gage elements. The unbalance of the bridge causes meter 62 to deflect an amount indicative of the forces exerted on the strain gage elements.

Fig. 8, wherein like reference numerals designate like parts in Fig. 7, illustrates a modified arrangement of Fig. 7 employing a D. C. power source in lieu of the A. C. power source of Fig. 7. Due to the use of the D. C. power source, the arrangement of Fig. 8 does not require a phase adjusting network. Otherwise, the circuit of Fig. 8 operates in the same manner as the circuit of Fig. 7.

In accordance with the present invention a new and improved balance has been devised which is economical to manufacture, efficient in operation and which comprises a plurality of flexible webs disposed internally of the aerodynamic model under test whereby the external forces acting on the model are measured internally of the model by a plurality of strain gages secured to the web structure of the balance and yieldable an amount indicative of the magnitude and direction of the force applied thereto, the gages being electrically connected to a measuring apparatus in such a manner as to produce a visual indication of the magnitude of such forces.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An internal balance for measuring an external rolling moment around the longitudinal axis of an aerodynamic body, in combination, an elongated cylindrical element for supporting said body, a sting for supporting said element, a cruciform member integrally formed with said element and consisting of four separate flexible webs having opposed surfaces and responsive to said rolling moment, and four pairs of strain gages with each of said pairs of gages being associated with one of said webs respectively, said gages being secured to said opposed surfaces of the associated web and yieldable in proportion to the magnitude and direction of distortion of the web in response to said rolling moment, and a measuring apparatus electrically connected to said strain gages for producing a visual indication in accordance with said magnitude and direction of said rolling moment.

2. An internal balance for measuring an external rolling moment of an aerodynamic body, in combination, a sting, an elongated cylindrical element secured to said sting, a flexible member integrally formed with said element and comprising separate circumferentially spaced and radially disposed webs, each web having opposite side surfaces, and pairs of strain gages, each of said pairs of strain gages being secured to each of said webs respectively and disposed on the opposite side surfaces thereof, and a hollow aerodynamic test model body connected to said element for support thereby said element being disposed wholly within said body.

3. A device for measuring roll-moment comprising an elongated body having two end portions, one end portion being adapted to be connected to a support means and the other end portion being adapted to support a part having a roll-moment applied thereto, said body including a cruciate formation disposed between an interconnecting said end portions, said formation being composed of four separate elongated flexible webs spaced circumferentially 90° from each other and integrally formed at their ends with said end portions, each of said webs having a pair of opposite planar surfaces which are parallel to each other, said planar surfaces being substantially radially disposed, and a plurality of strain gages, each of said gages being disposed on each of said planar surfaces respectively, said gages being adapted to be connected to means for indicating the magnitude of the roll-moment.

4. In a torque measuring device, an elongated cylindrical body having longitudinally spaced apart end portions interconnected by a cruciform arrangement, said cruciform arrangement comprising four individual elongated flexible webs radially disposed and circumferentially spaced about the longitudinal axis of the body, each web having a pair of parallel planar side surfaces, and four pairs of strain gages with a strain gage secured to each of said side surfaces respectively.

5. In a torque measuring device, an elongated body comprising two end portions spaced apart along the longitudinal axis of the body and interconnected by a cruciate formation, said cruciate formation consisting of four separate flexible webs circumferentially spaced 90° from each other, each of said webs having opposite planar surfaces substantially radially disposed with respect to the longitudinal axis of the body, and four pairs of strain gages with a strain gage secured to each of said planar surfaces respectively.

References Cited in the file of this patent

UNITED STATES PATENTS

| | | |
|---|---|---|
| 2,392,293 | Ruge | Jan. 1, 1946 |
| 2,415,513 | Martin et al. | Feb. 11, 1947 |
| 2,485,977 | Mains | Oct. 25, 1949 |
| 2,592,796 | Doussain | Apr. 15, 1952 |
| 2,700,896 | Root | Feb. 1, 1955 |
| 2,768,526 | Trimble et al. | Oct. 30, 1956 |
| 2,782,636 | Peucker | Feb. 26, 1957 |
| 2,785,569 | Miller | Mar. 19, 1957 |